United States Patent

Kroutil et al.

[11] Patent Number: 5,954,092
[45] Date of Patent: Sep. 21, 1999

[54] PULSED FLOW GENERATOR

[75] Inventors: Joseph C. Kroutil, Florissant, Mo.; Miklos Sajben, Loveland, Ohio

[73] Assignee: McDonnel Douglas Corporation, St. Louis, Mo.

[21] Appl. No.: 08/796,143

[22] Filed: Feb. 6, 1997

[51] Int. Cl.[6] .............................. F16K 31/04; F16K 51/00
[52] U.S. Cl. ................... 137/624.13; 137/597; 137/595; 137/625.18
[58] Field of Search .......................... 137/624.11, 624.12, 137/624.13, 624.14, 624.15, 625.46, 597, 625.21, 595, 625.18

[56] References Cited

U.S. PATENT DOCUMENTS

| | | | |
|---|---|---|---|
| 1,515,673 | 11/1924 | Geissinger | 137/595 |
| 2,100,154 | 11/1937 | Ashton | 137/624.13 |
| 3,658,092 | 4/1972 | Walker et al. | 137/625.21 |
| 3,710,015 | 1/1973 | Fitzgerald | 137/624.11 |
| 3,937,440 | 2/1976 | MacGregor et al. | 137/624.11 |
| 4,621,679 | 11/1986 | Byers et al. | 137/625.46 |
| 4,625,763 | 12/1986 | Schick et al. | 137/625.46 |
| 5,217,045 | 6/1993 | Gramm | 137/595 |

FOREIGN PATENT DOCUMENTS

| | | | |
|---|---|---|---|
| 346409 | 6/1960 | Sweden | 137/595 |
| 580421 | 9/1946 | United Kingdom | 137/595 |

*Primary Examiner*—Kevin Lee
*Assistant Examiner*—Bryan C. Wallace
*Attorney, Agent, or Firm*—Veo Peoples, Jr.; Benjamin Hudson, Jr.

[57] ABSTRACT

There is provided a high frequency pulse generator having inlet ports for receiving a fluid mass flow rate and output ports that produce a pulse flow rate therefrom by being opened and closed by a chopper wheel. The duty cycle of the generator is controlled by the ratio of the aperture sections of the chopper wheel to the closure sections of the wheel. The housing of the pulse generator may be divided into separate sealed chambers for receiving independent fluid mass flow rates in each chamber and providing independent variable phased pulsed output flow rates.

3 Claims, 2 Drawing Sheets

PULSED FLOW GENERATOR

BACKGROUND OF THE INVENTION

This invention relates generally to apparatus which can be utilized as high frequency fluid pulsators and, more particularly, to apparatus which can create a pulsed flow in which the pulse rate and the flow rate are independently controlled. Apparatus for generating a pulsing flow, either blowing or sucking a vacuum, has a variety of uses such as paint removal and surface cleaning processes; driving means for cutting tools, entrenching equipment, and pneumatic hammers; and in aerodynamic research, such applications as boundary layer flow separation, thrust vectoring, exhaust gas mixing and cooling, and noise reduction. In such aerospace applications as pulse jets, combustion is intermittent or pulsing rather than continuous and pulse generators enhance fuel burning efficiency.

Many prior art pulsator designs use some type of nozzle design with spring loaded shutters to generate the pulse flow. These devices are limited by the mass flow rate that can be achieved. Other designs have problems with friction and load angularity which inhibit any mechanical coupling.

It is an object of this invention to provide a device to pulse or chop an otherwise steady fluid flow stream to produce a pulsed stream that can be used to calibrate a fluctuating thrust measuring device that has the capability to measure both frequency and force simultaneously.

It is another object of this invention to obtain high frequency pulsed and clearly defined mass flow in which the pulse frequency, duty cycle, and mass flow rate can be independently controlled.

It is yet another object of this invention to provide multiple chambers that allow more than one flow rate, frequency or phase when required.

SUMMARY OF THE INVENTION

There is provided by this invention a pulsed flow generator that is generally comprised of an enclosure having an inlet port for receiving a mass fluid flow rate and outlet ports for exhausting a pulsing flow. The outlet ports are located on the outer perimeter of the enclosure and are opened and closed by one or more rotating chopper wheels passing over the inside edge of the ports. The chopper wheels are driven by a variable speed motor which controls the frequency. The phase is controlled with a keyless shaft locking device. Multiple chambers are provided in the enclosure, each individually sealed from the other to provide multiple output flow rates, frequency, duty cycle, and phasing.

BRIEF DESCRIPTION OF THE PREFERRED EMBODIMENT

Figure 1:
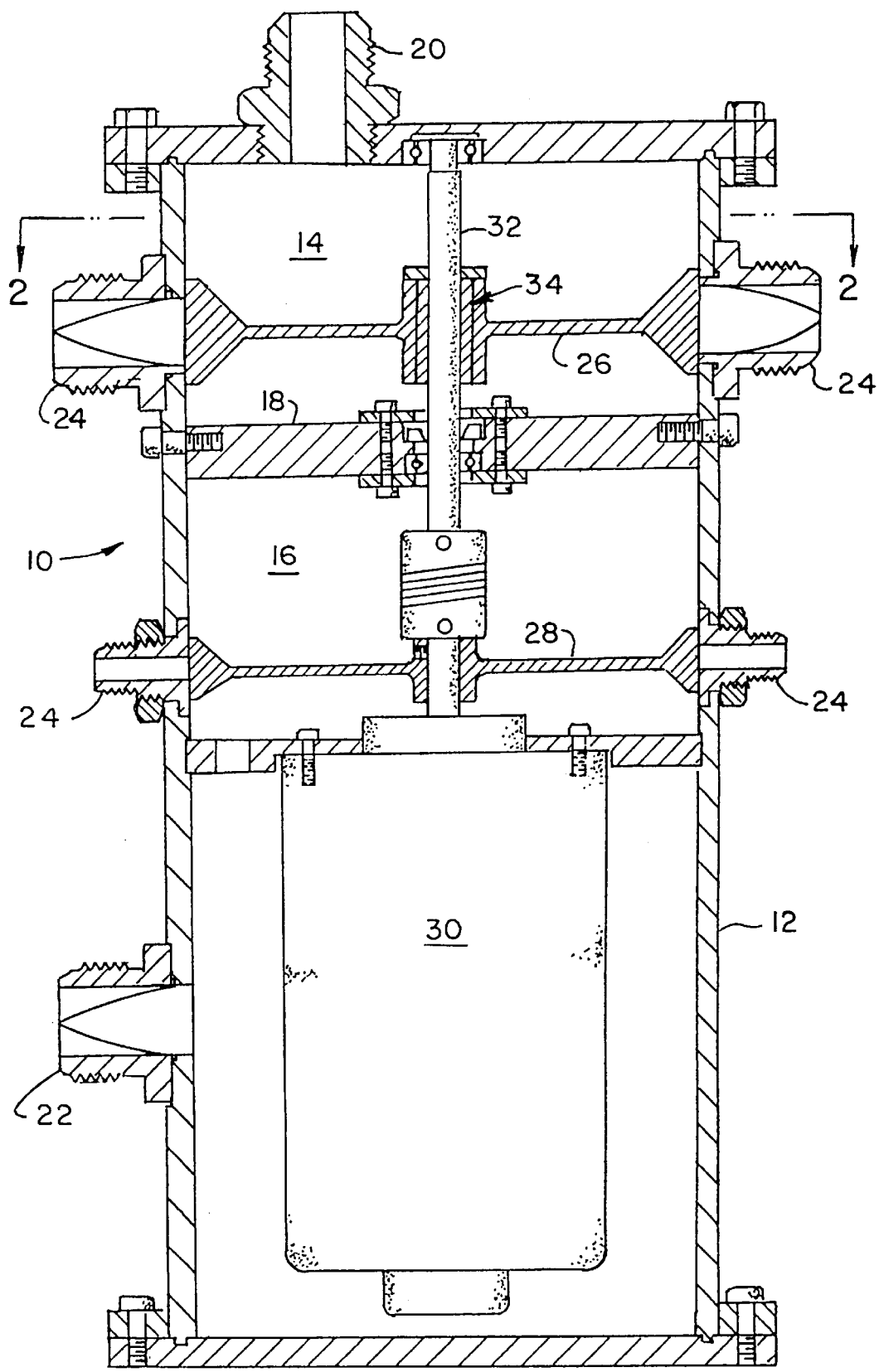
FIG. 1 is a sectional view of a pulse flow generator incorporating the principles of this invention.

Referring to FIG. 1 there is shown a pulsed flow generator generally at 10 incorporating the principles of this invention. The generator 10 is comprised of a sealed enclosed housing 12. The housing 12 is designed with the enclosure strength to accommodate the driving pressure of the pulsed flow needed for any specific application. In this embodiment the generator 10 is divided into two chambers 14 and 16 by a sealing wall 18. The sealing wall 18 prevents cross flow within the housing 12. Each chamber may provide independent frequency and pulsed flow outputs. Input ports such as 20 and 22 are connected to a driving pressure (not shown) to provide the mass fluid flow into the housing 12. The pressure applied to the input ports 20 and 22 may be positive or, in the case of pulsed vacuum flow rate, the pressure is negative. The pulsed output flow rate is provided at outlet ports such as 24 which are located on the outer perimeter of the enclosure 12 and are opened and closed by chopper wheels 26 and 28 which will be hereinafter described. The chopper wheels 26 and 28 are connected to a variable speed motor 30 by the drive shaft 32. The chopper wheels 26 and 28 fit close to the port outlets 24 for maximum port closing.

Figure 2:
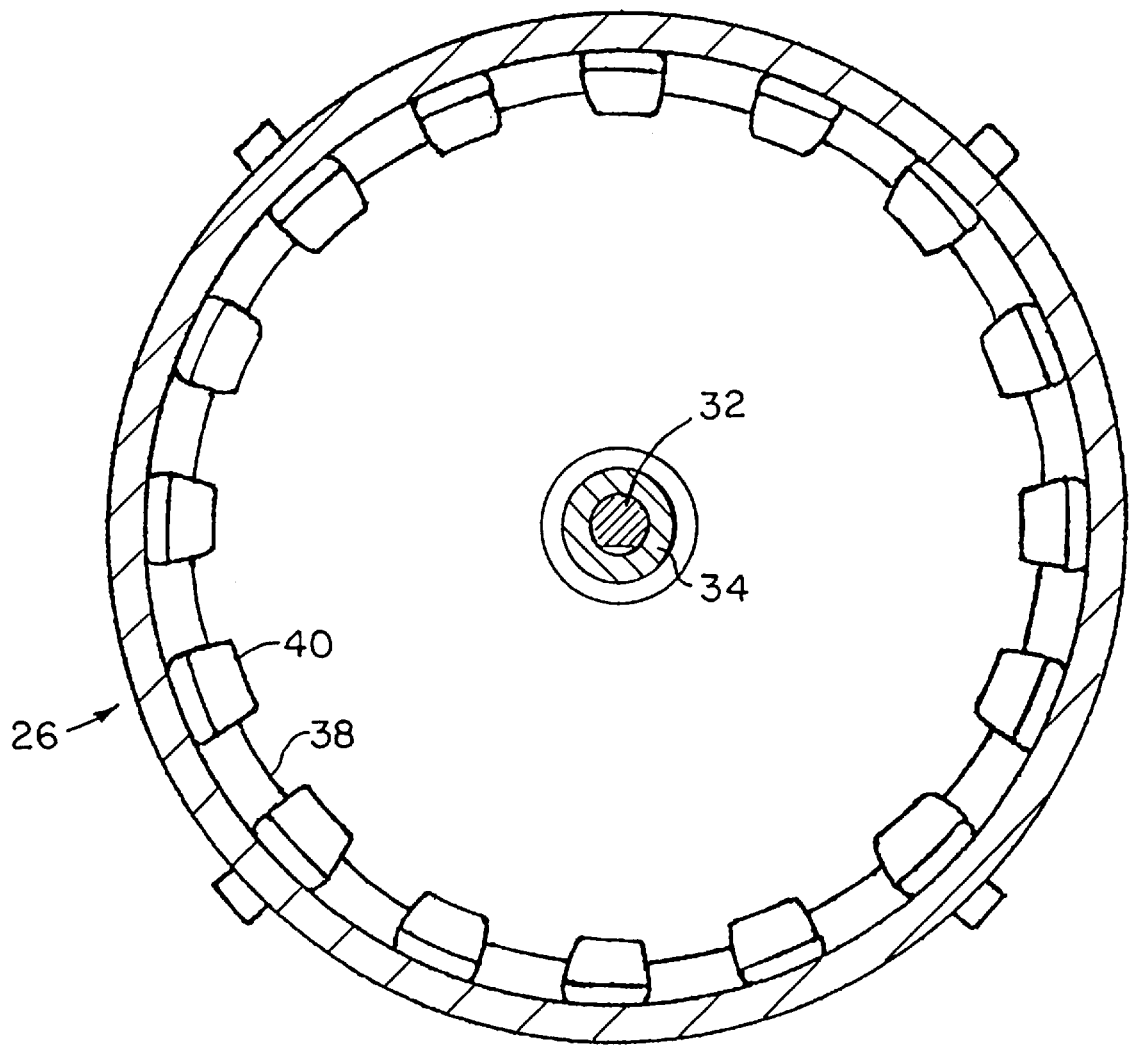
FIG. 2 is a sectional view of the chopper wheel of the pulse flow generator taken generally along the lines 2—2 of FIG. 1.

Referring to FIG. 2 the chopper wheel such as 26 has a keyless shaft locking device 34 that connects it to the shaft 32. The rotational position of one chopper wheel can be adjusted relative to the other to obtain the desired phase relation of the pulses exiting the two chambers. As the chopper wheel is rotated, aperture sections such as 38 and port closure sections, such as 40, pass over the ports 24. The ratio of aperture section 38 width to the port closure 40 width may be made to adjust the time open to close to determine the duty cycle. The port closure sections of the chopper wheel maintain a close fit when passing by the ports 24 keeping them closed. When an aperture passes over the port it is opened allowing a pulsed flow output. The frequency of the output at the ports is determined by the speed of the variable speed motor 30 and the number of teeth or closure sections 40 on the chopper wheel and the number of non-phased ports such as 24. The flow rate at the output is determined by the mass flow rate inputted at the input ports 20 and 22 by the driving pressure.

To operate the pulse flow generator, the variable speed motor 30 is turned on, which rotates the chopper wheels at the desired speed to control frequency. The fluid supply is turned on and adjusted to the desired flow rate at the input ports 20 and 22. The result will be a pulsed flow from the outlet ports 24. Varying the size of the nozzles at the output ports 24 can also control the mass flow produced by the jets 24.

Thus, there is provided a pulsed flow generator that has the capability to provide controllable mass flow rates, pulsed at frequencies ranging from zero (steady flow) to several kHz. The flow may be blowing or vacuum sucking, depending on the driving pressure, and limited only by the strength of the housing.

Although there has been illustrated and described specific detail and structure of operation, it is clearly understood that the same were merely for purposes of illustration and that changes and modifications may be readily made therein by those skilled in the art without departing from the spirit and the scope of this invention.

What we claim is:

1. A pulsed flow generator comprising:
    (a) a housing having multiple sealed chambers, each chamber having independent inlet parts for receiving a fluid mass flow rate;
    (b) each chamber also having independent outlet ports on the perimeter of said housing;
    (c) a driving means for delivering predetermined variable speed to a rotatable shaft having a shaft locking device that connects it to multiple rotating means; and
    (d) said multiple rotating means being each individually disposed within one of the multiple sealed chambers and in close proximity to the outlet ports of said chamber so as to open and close said outlet ports intermittently;

wherein the driving means rotates the shaft that, in turn, rotates the multiple rotating means while the fluid flows through the inlet ports into the sealed chambers of the housing, resulting in a pulsed or intermittent flow out of the outlet ports.

2. A pulsed flow generator as recited in claim 1 wherein the rotating means are chopper wheels disposed to open and close the outlet ports of the housing to control a duty cyle.

3. A pulsed flow generator as recited in claim 1 wherein the driving means is a variable speed motor.

\* \* \* \* \*

UNITED STATES PATENT AND TRADEMARK OFFICE
CERTIFICATE OF CORRECTION

PATENT NO. : 5,954,092
DATED : September 21,1999
INVENTOR(S) : Joseph C. Kroutil; Miklos Sajben It is certified that error appears in the above-identified patent and that said Letters Patent is hereby corrected as shown below:

Column 2, line 40 delete "output" and insert --outlet--.

Column 2, lines 41-42, delete "produced by the jets 24".

Column 2, claim 1, line 59, delete "parts" and insert --ports--.

Column 2, claim 1, lines 59-60, delete "a fluid mass flow rate" and insert --an inlet fluid--.

Column 2, claim 1, line 65, delete "it" and insert --said shaft--.

Signed and Sealed this

Eighteenth Day of April, 2000

*Attest:*

Q. TODD DICKINSON

*Attesting Officer*     Director of Patents and Trademarks